United States Patent
Nadeau-Dostie et al.

(10) Patent No.: US 12,488,852 B2
(45) Date of Patent: Dec. 2, 2025

(54) READ-ONLY MEMORY DIAGNOSIS AND REPAIR

(71) Applicant: Siemens Industry Software Inc., Plano, TX (US)

(72) Inventors: Benoit Nadeau-Dostie, Gatineau (CA); Jongsin Yun, Portland, OR (US)

(73) Assignee: Siemens Industry Software Inc., Plano, TX (US)

( * ) Notice: Subject to any disclaimer, the term of this patent is extended or adjusted under 35 U.S.C. 154(b) by 322 days.

(21) Appl. No.: 18/273,059

(22) PCT Filed: Jan. 29, 2021

(86) PCT No.: PCT/US2021/015762
§ 371 (c)(1),
(2) Date: Jul. 19, 2023

(87) PCT Pub. No.: WO2022/164445
PCT Pub. Date: Aug. 4, 2022

(65) Prior Publication Data
US 2024/0087665 A1    Mar. 14, 2024

(51) Int. Cl.
*G11C 29/38* (2006.01)
*G11C 29/44* (2006.01)

(52) U.S. Cl.
CPC .......... *G11C 29/38* (2013.01); *G11C 29/4401* (2013.01)

(58) Field of Classification Search
CPC ...... G11C 29/38; G11C 29/4401; G11C 29/44
See application file for complete search history.

(56) References Cited

U.S. PATENT DOCUMENTS

| | | |
|---|---|---|
| 4,601,031 A | 7/1986 | Walker et al. |
| 5,208,780 A | 5/1993 | Iwase et al. |
| 6,031,771 A | 2/2000 | Yiu et al. |
| 6,097,206 A * | 8/2000 | Takano .................. G11C 29/56 324/762.01 |
| 6,192,495 B1 * | 2/2001 | Totorica ........... G01R 31/31935 714/724 |
| 8,612,814 B1 | 12/2013 | Ang et al. |
| 8,839,054 B2 | 9/2014 | Braceras et al. |
| 9,003,251 B2 | 4/2015 | Prakash |

(Continued)

OTHER PUBLICATIONS

N. Muklherjee et al., "BIST-Based Fault Diagnosis for Read-Only Memories," IEEE Transactions On Computer-Aided Design of Integrated Circuits and Systems, vol. 30, No. 7, Jul. 2011.

(Continued)

*Primary Examiner* — Mohammed A Bashar (57) ABSTRACT

A testing circuit configured to test and diagnose a read-only memory comprises two multiple-input signature registers configured to generate two sets of signatures for multiple iterations of reading some or all of words stored in the read-only memory, control circuitry configured to control, according to a test algorithm, from which of the outputs of the read-only memory each of the two multiple-input signature registers receives test response signal bits for each of the reading operations during each of the iterations, and a faulty element location determination device configured to generate a faulty element location signal for the read-only memory based on results of comparing the two sets of signatures with reference signatures.

19 Claims, 7 Drawing Sheets

(56) References Cited

U.S. PATENT DOCUMENTS

| | | |
|---|---|---|
| 9,460,811 B2 | 10/2016 | Braceras et al. |
| 2007/0050693 A1 | 3/2007 | Kiryu |
| 2011/0241741 A1 | 10/2011 | Batenburg et al. |
| 2014/0351662 A1 | 11/2014 | Braceras et al. |
| 2019/0244672 A1* | 8/2019 | Okayama ............... G11C 29/38 |

OTHER PUBLICATIONS

N. Muklherjee et al., "Fault Diagnosis for Embedded Read-Only Memories," 2009 International Test Conference.

* cited by examiner

Flow Chart 300

Performing M=log₂N iterations of reading N elements from a read-only memory, in the $K^{th}$ iteration, two multiple-input signature register alternatively receive test response signal bits for every $2^{K-1}$ consecutive elements in the N elements — 310

Outputting a first test response signature from the first multiple-input signature register and a second test response signature from the second multiple-input signature register for each of the M=log₂N iterations — 320

Generating a first pass-fail signal and a second pass-fail signal by comparing the first test response signatures with first reference test response signatures and the second test response signatures with second reference test response signatures, respectively — 330

Generating a faulty element location signal for the read-only memory based on values of the first pass-fail signal and the second pass-fail signal for each of the M=log₂N iterations — 340

FIG. 4

| Iterations | Faulty Word Address Bit | First MISR | Second MISR | Faulty Word Address |
|---|---|---|---|---|
| [0] | [0] | 0,2,4,6 | 1,3,5,7 | 1 |
| [1] | [1] | 0,1,4,5 | 2,3,6,7 | 0 |
| [2] | [2] | 0,1,2,3 | 4,5,6,7 | 1 |

Flow Chart 800

Performing $P = \log_2 Q$ iterations of reading words from a read-only memory, in the $J^{th}$ iteration, the first multiple-input signature register receives the test response signal bits from every $2^{J-1}$ other consecutive outputs while the second multiple-input signature register receives them from the rest of the Q outputs — 810

Outputting a first test response signature from the first multiple-input signature register and a second test response signature from the second multiple-input register for each of the $P = \log_2 Q$ iterations — 820

Generating a first pass-fail signal and a second pass-fail signal by comparing the first test response signatures with first reference test response signatures and the second test response signatures with second reference test response signatures, respectively — 830

Generating a faulty output location signal for the read-only memory based on values of the first pass-fail signal and the second pass-fail signal for each of the $P = \log_2 Q$ iterations — 840

READ-ONLY MEMORY DIAGNOSIS AND REPAIR

FIELD OF THE DISCLOSED TECHNIQUES

The presently disclosed techniques relates to memory testing. Various implementations of the disclosed techniques may be particularly useful for improving diagnosis and manufacturing yield of embedded read-only memories (ROMs).

BACKGROUND OF THE DISCLOSED TECHNIQUES

Current high-density semiconductors often include embedded memories. Designed tightly to the technology limits, memories are more prone to failures than other circuits, which can affect yield adversely. Testing and diagnosis of a faulty memory help in identifying the exact location of defect(s) in the memory. Compared to their stand-alone counterparts, embedded memories are difficult to test and diagnose. Complex structures of embedded memories paired with a reduced bandwidth of test channels leads to limited accessibility and controllability. As such, the memory built-in self-test (MBIST) has become the mainstream methodology for testing embedded memories.

Read-only memories are useful in a variety of applications. Traditionally, they were primarily used for long-term data storage, such as look-up tables in multimedia processors or permanent code storage in microprocessors. Due to the high area density and new submicrometer technologies involving multiple metal layers, read-only memories have also gained popularity as a storage solution for low-voltage/low-power designs. In a typical test of an embedded read-only memory, an MBIST-based testing circuit reads the content of the read-only memory multiple times with different addressing schemes and compresses the test responses into a signature using a multiple-input signature register (MISR). The resultant signature is then compared with the signature expected from a fault-free memory (also referred to as reference signature). However, such a test usually does not identify the location of the failing element (failing bit, word, row or column). One technique for diagnosing a faulty read-only memory is to download the signature value at certain intervals according to a binary search technique to an external tester. Another technique is to download the content of the entire read-only memory when a failure occurs. These techniques can derive the failing address and data, but they are complex, time consuming, and often prohibitive in practice.

In "BIST-Based Fault Diagnosis for Read-Only Memories," IEEE Transactions on Computer-Aided Design of Integrated Circuits and Systems, Vol. 30, No. 7, 2011, N. Mukherjee et al. proposed, a process based on an uninterrupted collection and processing of test responses at the system speed. In particular, the scheme partitions rows and columns of a ROM array deterministically and records signatures corresponding to array segments being currently read (observed), every time narrowing down possible error locations until the failing rows and columns are determined. This technique neither requires interactions between BIST and the tester nor interrupts a test flow. In U.S. Pat. No. 9,003,251, S. Prakash proposed a testing and diagnosis process based on reducing a test "window" repeatedly to locate the failing element. While maybe feasible for practical applications, both of the above two techniques require complex tester programming to communicate with an embedded BIST controller. It is thus desirable to search for an approach allowing a BIST controller to diagnose and maybe also repair ROMs in an autonomous fashion while minimizing the amount of circuitry required to implement the solution and the amount of information to be transferred to/from a tester.

BRIEF SUMMARY OF THE DISCLOSED TECHNIQUES

Various aspects of the disclosed technology relate to test and diagnose embedded read-only memories. In one aspect, there is a testing circuit in a circuit configured to test a read-only memory in the circuit, the testing comprising iterations of reading some or all of words stored in the read-only memory, the testing circuit comprising: a first multiple-input signature register configured to generate a first test response signature for each of the iterations based on test response signal bits received from outputs of the read-only memory during the each of the iterations; a second multiple-input signature register configured to generate a second test response signature for each of the iterations based on test response signal bits received from outputs of the read-only memory during the each of the iterations; control circuitry configured to control, according to a test algorithm, from which of the outputs of the read-only memory each of the first multiple-input signature register and the second multiple-input signature register receives the test response signal bits for each of the reading operations during each of the iterations; a first comparator configured to generate a first pass-fail signal based on comparing the first test response signatures with first reference test response signatures; a second comparator configured to generate a second pass-fail signal based on comparing the second test response signatures with second reference test response signatures; and a faulty element location determination device configured to generate a faulty element location signal for the read-only memory based on values of the first pass-fail signal and the second pass-fail signal for each of the iterations.

The testing circuit may further comprise: a fail status device configured to generate a fail status signal indicating status of the read-only memory based on the first fail signal and the second fail signal, the status comprising fault-free, repair-needed, and non-repairable.

The control circuitry may comprise enable circuitry configured to generate an enable signal to enable either the first multiple-input signature register or the second multiple-input signature register, gating circuitry configured to allow the test response signal bits to be received by either the first multiple-input signature register or the second multiple-input signature register, or both of the enable circuitry and the gating circuitry.

The test algorithm may comprise: performing $M=\log_2 N$ iterations of reading N elements from the read-only memory, wherein in a $K^{th}$ iteration of the $M=\log_2 N$ iterations (K=1 to M), the first multiple-input signature register and the second multiple-input signature register alternatively receive the test response signal bits for every $2^{K-1}$ consecutive elements in the N elements, an element being a word, a row of words, a row block of words, a column of words, or a column block of words. Alternatively or additionally, the test algorithm may comprise: performing $P=\log_2 Q$ iterations of reading W words from the read-only memory, Q being a number of the outputs of the read-only memory, wherein in a $J^{th}$ iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory.

The testing circuit may further comprise: bit repair circuitry, the bit repair circuitry comprising: XOR gates, a number of the XOR gates being equal to Q, a decoder configured to generate Q bits representing pass or fail based on a faulty output location signal derived based on the $P=\log_2 Q$ iterations, two inputs for each of the XOR gates being coupled to one of the outputs of the read-only memory and one of outputs of the decoder, respectively, and a comparator configured to generate an enable signal to enable or disenable the decoder based on comparing a functional address signal received by the read-only memory with a faulty word location signal derived based on the $U=\log_2 W$ iterations, wherein the faulty element location signal comprises the faulty word location signal and the faulty output location signal.

The testing circuit may further comprise: repair circuitry configured to replace bits outputted from the read-only memory in response to a reading operation with bits stored in the circuit as output bits of the read-only memory when an address for the reading operation matches an address for an faulty element or one of addresses for faulty elements represented by the faulty element location signal, the faulty element being a faulty word, and the faulty elements being a faulty row of words or a faulty row block of words.

In another aspect, there is one or more computer-readable media storing computer-executable instructions for causing a computer to perform a method, the method comprising: creating, in a circuit design, the above testing circuit.

In still another aspect, there is a method for testing a read-only memory in a circuit, the circuit comprising a first multiple-input signature register and a second multiple-input signature register, the method comprising: performing $M=\log_2 N$ iterations of reading N elements from the read-only memory, wherein in a $K^{th}$ iteration of the $M=\log_2 N$ iterations (K=1 to M), the first multiple-input signature register and the second multiple-input signature register alternatively receive test response signal bits from the read-only memory for every $2^{K-1}$ consecutive elements in the N elements, an element being a word, a row of words, a row block of words, a column of words, or a column block of words; outputting a first test response signature from the first multiple-input signature register and a second test response signature from the second multiple-input signature register for each of the $M=\log_2 N$ iterations; generating a first pass-fail signal by comparing the first test response signatures with first reference test response signatures and a second pass-fail signal by comparing the second test response signatures with second reference test response signatures; and generating a faulty element location signal for the read-only memory based on values of the first pass-fail signal and the second pass-fail signal for each of the $M=\log_2 N$ iterations.

The method may further comprise: performing $P=\log_2 Q$ iterations of reading words from the read-only memory, Q being a number of the outputs of the read-only memory, wherein in a iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory; outputting a third test response signature from the first multiple-input signature register and a fourth test response signature from the second multiple-input signature register for each of the $P=\log_2 Q$ iterations; generating a third pass-fail signal by comparing the third test response signatures with third reference test response signatures and a fourth pass-fail signal by comparing the fourth test response signatures with fourth reference test response signatures; and generating a faulty output location signal for the read-only memory based on values of the third pass-fail signal and the fourth pass-fail signal for each of the $P=\log_2 Q$ iterations.

In still another aspect, there is a method for testing a read-only memory in a circuit, the circuit comprising a first multiple-input signature register and a second multiple-input signature register, the method comprising: performing $P=\log_2 Q$ iterations of reading words from the read-only memory, Q being a number of outputs of the read-only memory, wherein in a $J^{th}$ iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory; outputting a first test response signature from the first multiple-input signature register and a second test response signature from the second multiple-input signature register for each of the $P=\log_2 Q$ iterations; generating a first pass-fail signal by comparing the first test response signatures with first reference test response signatures and a second pass-fail signal by comparing the second test response signatures with second reference test response signatures; and generating a faulty output location signal for the read-only memory based on values of the first pass-fail signal and the second pass-fail signal for each of the $P=\log_2 Q$ iterations.

Certain inventive aspects are set out in the accompanying independent and dependent claims. Features from the dependent claims may be combined with features of the independent claims and with features of other dependent claims as appropriate and not merely as explicitly set out in the claims.

Certain objects and advantages of various inventive aspects have been described herein above. Of course, it is to be understood that not necessarily all such objects or advantages may be achieved in accordance with any particular embodiment of the disclosed techniques. Thus, for example, those skilled in the art will recognize that the disclosed techniques may be embodied or carried out in a manner that achieves or optimizes one advantage or group of advantages as taught herein without necessarily achieving other objects or advantages as may be taught or suggested herein.

DETAILED DESCRIPTION OF THE DISCLOSED TECHNIQUES

Various aspects of the disclosed technology relate to test and diagnose embedded read-only memories. In the following description, numerous details are set forth for the purpose of explanation. However, one of ordinary skill in the art will realize that the disclosed technology may be practiced without the use of these specific details. In other instances, well-known features have not been described in details to avoid obscuring the disclosed technology.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

The detailed description of a method or a device sometimes uses terms like "generate," "compare," and "perform" to describe the disclosed method or the device function/structure. Such terms are high-level descriptions. The actual operations or functions/structures that correspond to these terms will vary depending on the particular implementation and are readily discernible by one of ordinary skill in the art.

As used in this disclosure, the singular forms "a," "an," and "the" include the plural forms unless the context clearly dictates otherwise. Additionally, the term "includes" means "comprises." Moreover, unless the context dictates otherwise, the term "coupled" means electrically or electromagnetically connected or linked and includes both direct connections or direct links and indirect connections or indirect links through one or more intermediate elements not affecting the intended operation of the circuit.

Figure 1:
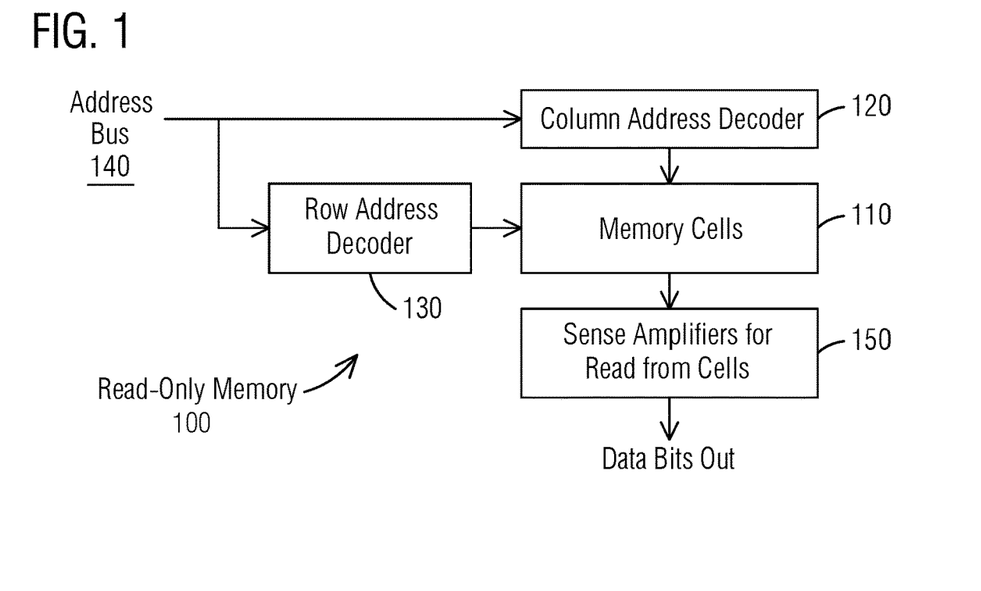
FIG. 1 illustrates an example of a block diagram of a read-only memory.

FIG. 1 illustrates an example of a block diagram of a read-only memory 100. The read-only memory 100 comprises memory cells 110, a column address decoder 120, a row address decoder 130, and sense amplifiers 150. The memory cells 110 can be connected in a two-dimensional array. Each of the memory cells 110 can store one bit of binary information. The memory cells 110 can be grouped into memory words of fixed word length, for example 1, 2, 4, 8, 16, 32, 64 or 128 bit. A memory cell has two fundamental components: storage node and select device. The storage node stores the data bit for the memory cell, and the select device component facilitates the memory cell to be addressed to read in an array.

The row address decoder 130 and the column address decoder 120 determine the cell address that needs to be accessed. Every row can have multiple words. Bits belonging to one word can be either placed one after another or be interleaved forming segments. Based on the addresses on row address decoder 130 and the column address decoder 120, the corresponding row(s) and column(s) get selected and connected to the sense amplifiers 160. Each of the sense amplifiers 150 sends out a data bit. The address information is supplied through an address bus 140.

Figure 2:
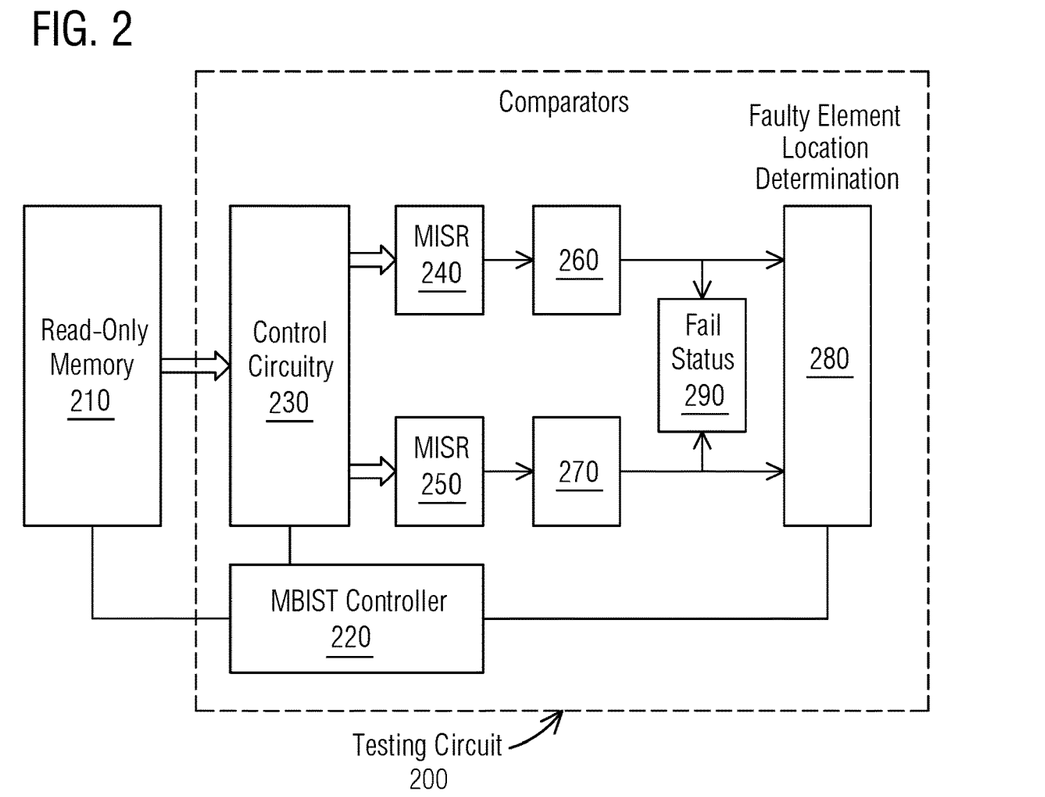
FIG. 2 illustrates an example of a block diagram of a testing circuit that can test and diagnose a read-only memory autonomously according to various embodiments of the disclosed technology.

FIG. 2 illustrates an example of a block diagram of a testing circuit 200 that can test and diagnose a read-only memory autonomously according to various embodiments of the disclosed technology. The testing circuit 200, configured to test a read-only memory 210, comprises a memory built-in self-test (MBIST) controller 220, control circuitry 230, two multiple-input signature registers 240 and 250, two comparators 260 and 270, and a faulty element location determination device 280. The MBIST controller 220 can be programmed by signals sent via a TAP (test access port), which may be a JTAG (joint test action group) TAP conforming to IEEE Standard 1149.1. The connection between the TAP 340 and the MBIST controller 220 can be, for example, an IJTAG (internal JTAG, IEEE Standard 1687) network. The MBIST controller 220 can execute a test by applying iterations of reading some or all of words stored in the read-only memory 210. If the test is for testing and diagnosing the whole read-only memory 210, each iteration can cover all of the stored words. If the test is for testing and diagnosing a specific section of the read-only memory 210, each iteration can cover the words stored in that specific section.

For each of the iterations, the first multiple-input signature register 240 generates a first test response signature based on the test response signal bits received from outputs of the read-only memory 210, and the second multiple-input signature register 250 generates a second test response signature based on the test response signal bits received from outputs of the read-only memory 210. The control circuitry 230 controls, according to a test algorithm executed by the MBIST controller 220, from which of the outputs of the read-only memory 210 each of the first multiple-input signature register 240 and the second multiple-input signature register 250 receives the test response signal bits for each of the reading operations during each of the iterations. A built-in self-test system typically has one multiple-input signature register for specific outputs of a device-under-test. By contrast, the disclosed technology can use two multiple-input signature registers to receive signals from the same set of outputs of a read-only memory at different times or from different outputs simultaneously.

The first comparator 260 compares the first test response signatures with the first reference test response signatures to generate a first pass-fail signal; and the second comparator 270 compares the second test response signatures with the second reference test response signatures to generate a second pass-fail signal. The first reference test response signatures and the second reference test response signatures can be stored in a storage device in the circuit comprising the read-only memory 210 permanently or in the read-only memory 210 itself. They can also be delivered to a storage device in the circuit before or during the test. The faulty element location determination device 280 can generate a faulty element location signal for the read-only memory 210 based on values of the first pass-fail signal and the second pass-fail signal for each of the iterations.

The testing circuit 200 may further comprise a fail status device 290. The fail status device 290 is configured to generate a fail status signal indicating status of the read-only memory based on the first fail signal and the second fail signal. The status can comprise fault-free, repair-needed (or diagnosable), and non-repairable (or non-diagnosable). According to some embodiments of the disclosed technology, if neither the first pass-fail signal nor the second pass-fail signal has a fail value for any of the iterations, the fail status device 290 can indicate the read-only memory 210 to be fault-free; if there is, for each of the iterations, just one of the first pass-fail signal and the second pass-fail signal has a fail value, the fail status device 290 can indicate that the read-only memory 210 is repair-needed (or diagnosable); and for the rest circumstances, the fail status device 290 can indicate that the read-only memory 210 is non-repairable (or non-diagnosable).

The testing circuit 200 can be configured to diagnose and repair memories having two faulty elements with hamming distance of their addresses being one in addition to ones having a single faulty element. In this case, if both of the first pass-fail signal and the second pass-fail signal have fail values for one of the iterations and only one of the first pass-fail signal and the second pass-fail signal has a fail value for the rest of the iterations, the fail status device 290 can indicate that the read-only memory 210 is repair-needed for two elements (or diagnosable), rather than non-repairable (or non-diagnosable).

Figure 3:
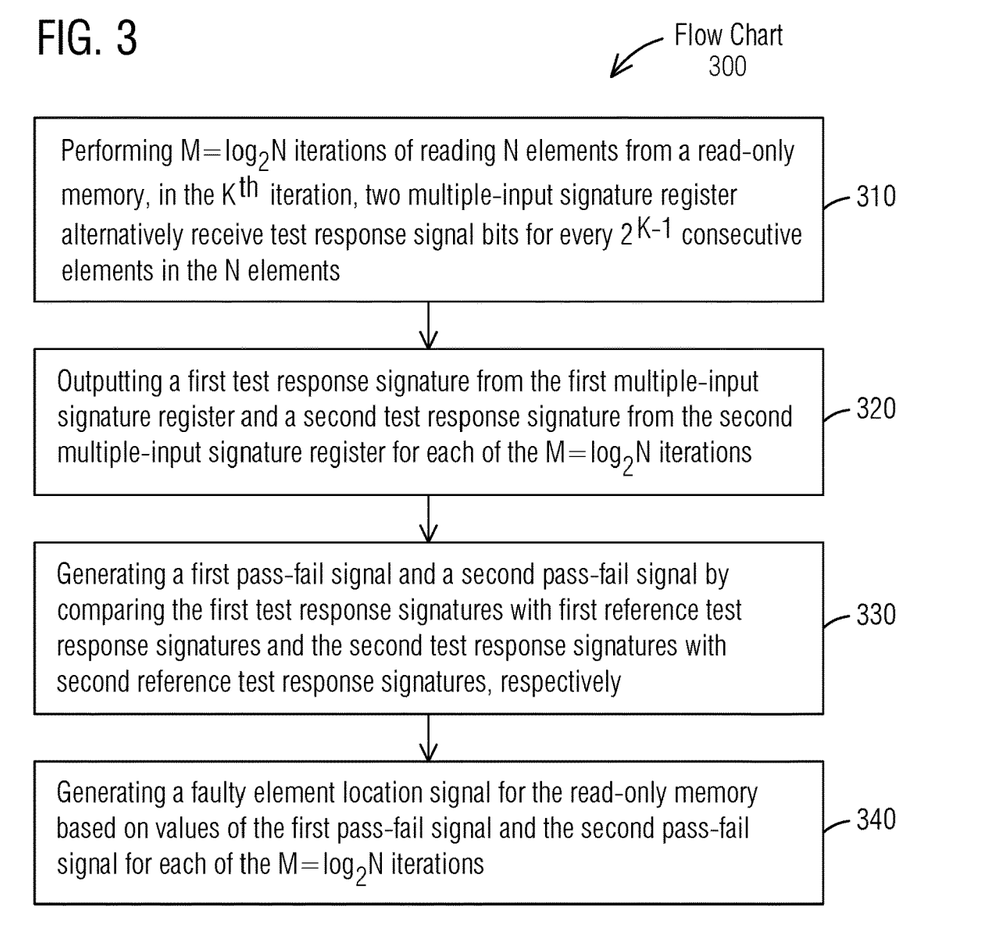
FIG. 3 illustrates a flowchart showing a process for diagnosing faulty elements of a read-only memory that may be implemented according to various examples of the disclosed technology.

FIG. 3 illustrates a flowchart 300 showing a process for diagnosing faulty elements of a read-only memory that may be implemented according to various examples of the disclosed technology. For ease of understanding, methods for diagnosing faulty elements of a read-only memory that may be employed according to various embodiments of the disclosed technology will be described with reference to the testing circuit 200 illustrated in FIG. 2 and the flow chart 300 illustrated in FIG. 3. It should be appreciated, however, that a different testing circuit may be used to perform the method for diagnosing faulty elements of a read-only memory illustrated by the flow chart 300 according to various embodiments of the disclosed technology. Likewise, the testing circuit 200 may be employed to perform other methods for diagnosing faulty elements of a read-only memory according to various embodiments of the disclosed technology.

In operation 310 of the flow chart 300, the MBIST controller 220 causes the read-only memory 210 to perform $M=\log_2 N$ iterations of reading N elements of the read-only memory 210. An element can be a word, a row of words, a row block of words, a column of words, or a column block of words. In the $K^{th}$ iteration of the $M=\log_2 N$ iterations (K=1 to M), the first multiple-input signature register 240 and the second multiple-input signature register 250 alternatively receive test response signal bits from the read-only memory 210 for every $2^{K-1}$ consecutive elements, controlled by the control circuitry 230.

In operation 320, for each of the $M=\log_2 N$ iterations, the first multiple-input signature register 240 and the second multiple-input signature register 250 output a first test response signature and a second test response signature, respectively. In operation 330, the comparator 260 generates a first pass-fail signal by comparing the first test response signatures with first reference test response signatures and the comparator 270 generates a second pass-fail signal by comparing the second test response signatures with second reference test response signatures. In operation 340, the faulty element location determination device 280 generates a faulty element location signal for the read-only memory 210 based on values of the first pass-fail signal and the second pass-fail signal for each of the $M=\log_2 N$ iterations.

Figure 4:
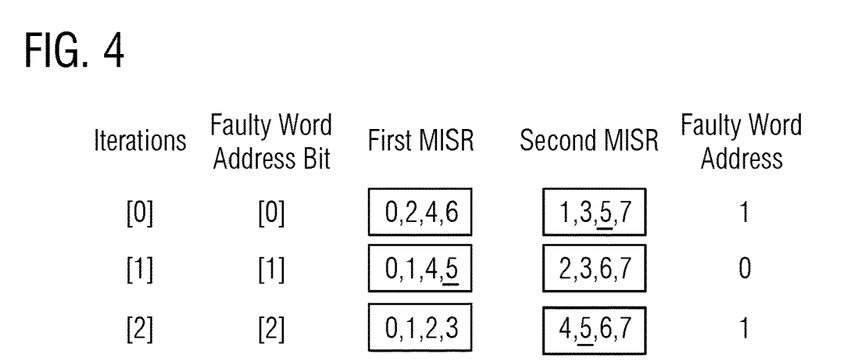
FIG. 4 illustrates an example of using the method illustrated by the flow chart in FIG. 3 to locate a faulty word.

FIG. 4 illustrates an example of using the method illustrated by the flow chart 300 to locate a faulty word. In this example, the read-only memory 210 stores eight words with addresses from 0 through 7. As such, $\log_2 8=3$ iterations of reading the eight words need to be performed. In the first iteration (iteration 0 shown in the figure), the first multiple-input signature register 240 receives test response signal bits from the read-only memory 210 for every $2^{1-1}=1$ consecutive words (words 0, 2, 4, 6) while the second multiple-input signature register 250 receives test response signal bits for the rest of the words (words 1, 3, 5, 7). In the second iteration (iteration 1 shown in the figure), the first multiple-input signature register 240 receives test response signal bits from the read-only memory 210 for every 2 24=2 consecutive words (words 0, 1, 4, 5) while the second multiple-input signature register 250 receives test response signal bits for the rest of the words (words 2, 3, 6, 7). In the third iteration (iteration 2 shown in the figure), the first multiple-input signature register 240 receives test response signal bits from the read-only memory 210 for every $2^{3-1}=4$ consecutive words (words 0, 1, 2, 3) while the second multiple-input signature register 250 receives test response signal bits for the rest of the words (words 4, 5, 6, 7).

In FIG. 4, word 5 is assumed to be faulty. As a result, the first pass-fail signal has values of 0, 1, and 0 for the three iterations, respectively, while the second pass-fail signal has values of 1, 0, and 1 for the three iterations, respectively. Without loss of generality, a value of 0 represents "pass" (the signature derived by the multiple-input signature register matches the reference signature) and a value of 1 represents "fail" (the signature derived by the multiple-input signature register differs from the reference signature). Only one of the two signatures for each of the three iterations fails, which means that one word is faulty and thus the read-only memory is repairable (or diagnosable). The address of the faulty word can be derived using, for example, the values of the second pass-fail signal: $1 \times 2^0 + 0 \times 2^1 + 1 \times 2^2 = 5$. As another example, assuming that word 2 is faulty, the first pass-fail signal would have values of 1, 0, and 1 for the three iterations, respectively, while the second pass-fail signal would have values of 0, 1, and 0 for the three iterations, respectively. The address of the faulty word can be derived as $0 \times 2^0 + 1 \times 2^1 + 0 \times 2^2 = 2$.

The method illustrated by the flow chart 300 can also be employed to diagnose a read-only memory when two faulty word addresses have a Hamming distance of 1. Assume that words 5 and 4 are faulty. The addresses for these two words (100 and 101) have a Hamming distance of 1. The first pass-fail signal would have values of 1, 1, and 0 for the three iterations, respectively, while the second pass-fail signal would have values of 1, 0, and 1 for the three iterations, respectively. The addresses of the faulty words can be derived, for example, based on the values of the second pass-fail signal and the first iteration which produces two fail signatures: $0\times2^0+0\times2^1+1\times2^2=4$ and $1\times2^0+0\times2^1+1\times2^2=5$. Similarly, faulty words 4 and 6 would lead to the first pass-fail signal having values of 1, 1, and 0 and the second pass-fail signal having values of 0, 1, and 1. The addresses of the faulty words can be derived as follows: $0\times2^0+0\times2^1+1\times2^2=4$ and $0\times2^0+1\times2^1+1\times2^2=6$.

Figure 5:
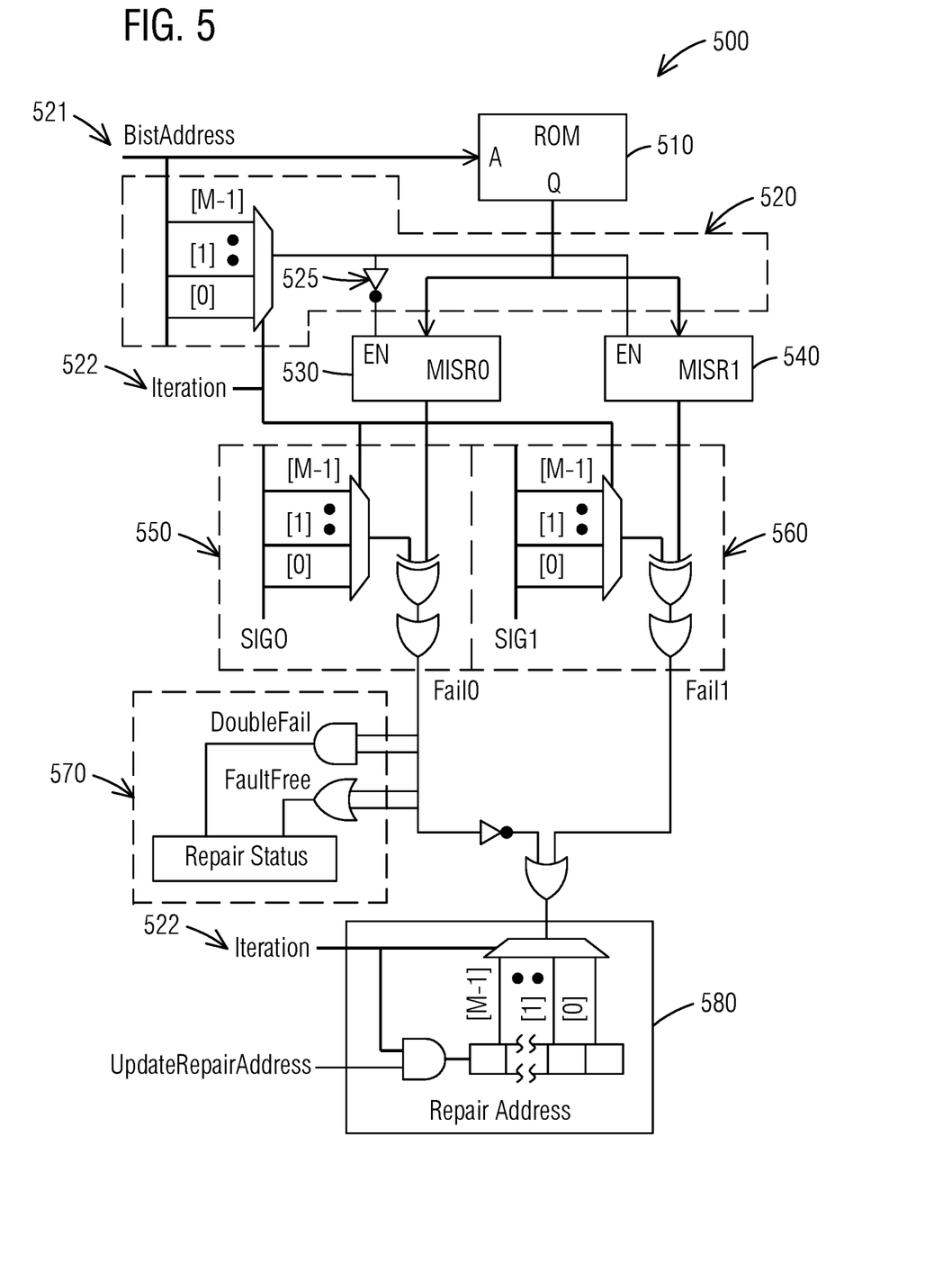
FIG. 5 illustrates an example of a detailed block diagram of a testing circuit that can test and diagnose a read-only memory autonomously according to various embodiments of the disclosed technology.

FIG. 5 illustrates an example of a detailed block diagram of a testing circuit 500 that can test and diagnose a read-only memory autonomously according to various embodiments of the disclosed technology. The testing circuit 500, configured to test a read-only memory 510, comprises control circuitry 520, two multiple-input signature registers 530 and 540, two comparators 550 and 560, a fail status device 570, and a faulty element location determination device 580. The control circuitry 520 controls, through enable ports of the two multiple-input signature registers 530 and 540, from which of the outputs of the read-only memory 510 they receive the test response signal bits for each of reading operations during each of iterations in a test. If one of the two multiple-input signature registers 530 and 540 is enabled to receive the test response signal bits, the other is disabled due to an inverter 525. The enable signal is changed based on an address signal 521 which is also used by the read-only memory 510 and an iteration signal 522. The address signal 521 and the iteration signal 522 can be provided by a MBIST controller not shown in the figure.

Each of the comparators 550 and 560 comprises a set of XOR gates, serving to compare bits of a test response signature outputted from a corresponding multiple-input signature register with bits of the corresponding reference signature. The outputs of these XOR gates are combined by an OR gate to generate a pass-fail signal. The fail status device 570 uses an AND gate to monitor whether both of the pass-fail signals fail for the same iteration and an OR gate to monitor whether both of the pass-fail signals pass for the same iteration. The status of the read-only memory 510 can be constructed based on the outputs of the AND and OR gates. The faulty element location determination device 580 can derive the repair address (fail address) for the read-only memory 510 based on values of the first pass-fail signal and the second pass-fail signal for each of the iterations.

Figure 6:
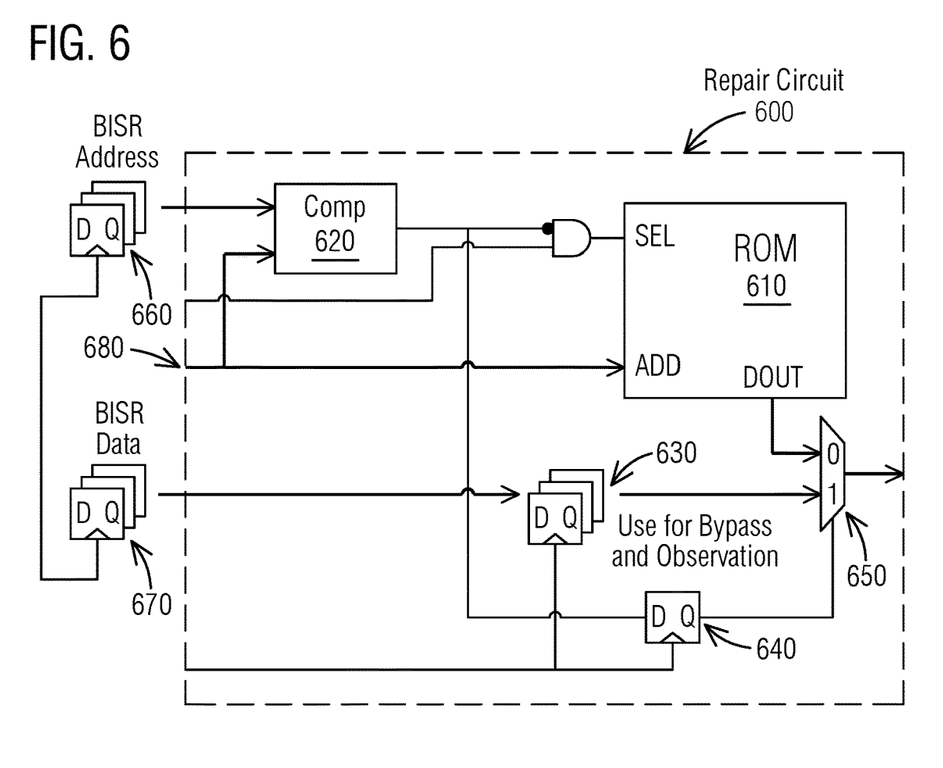
FIG. 6 illustrates an example of a block diagram of a repair circuit that can repair a word in a read-only memory according to various embodiments of the disclosed technology.

FIG. 6 illustrates an example of a block diagram of a repair circuit 600 that can repair a word in a read-only memory 610 according to various embodiments of the disclosed technology. The repair circuit 600 comprises a comparator 620, a data register 630, a select register 640, and a selection device 650. The comparator 620 is configured to compare the faulty element address stored in a built-in self-repair address register 660 with a functional address signal 680. If the two match each other, the read-only memory 610 is deselected and the output bits are drawn from the data bits stored in the data register 630 using the selection device 650. The select register 640 is controlled by the signal outputted from the comparator 620 and stored in the select register 640. The data bits stored in the data register 630 can be transferred from a built-in self-repair data register 670. The built-in self-repair address register 660 and the built-in self-repair data register 670 can provide repair information for more than one faulty word.

Figure 7:
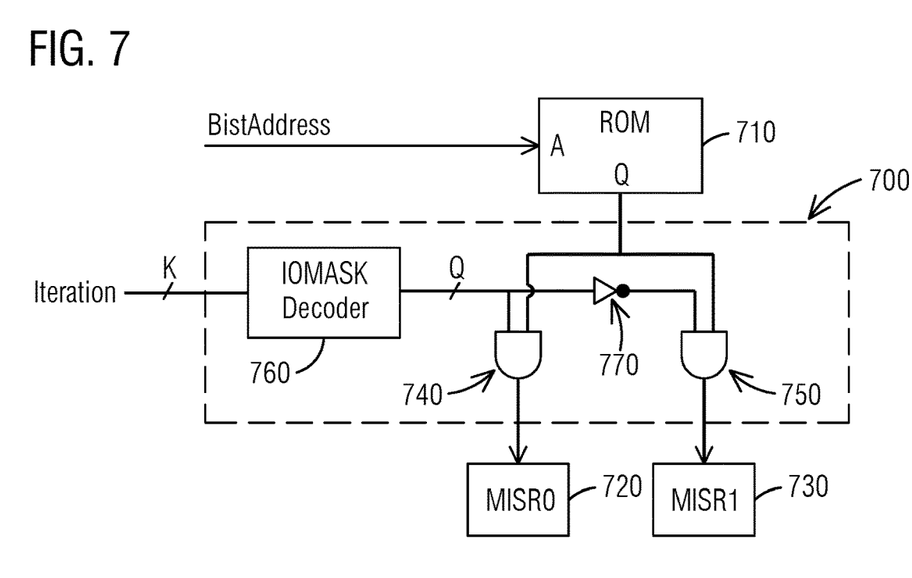
FIG. 7 illustrates an example of a block diagram of control circuitry according to various embodiments of the disclosed technology.

FIG. 7 illustrates an example of a block diagram of control circuitry 700 according to various embodiments of the disclosed technology. Like the control circuitry 520 in FIG. 5, the control circuitry 700 can control whether a first multiple-input signature register 720 or a second multiple-input signature register 730 receives test response signal bits from a read-only memory 710 for a reading operation during each iteration in a test. However, unlike the control circuitry 520 which uses the enabling signal to allow one of the multiple-input signature registers to receive test response bits at a specific time, the control circuitry 700 uses two sets of AND gates 740 and 750 as gating devices. The first set of AND gates 740 sits between outputs of the read-only memory 710 and inputs of the first multiple-input signature register 720, and the second set of AND gates 750 sits between outputs of the read-only memory 710 and inputs of the second multiple-input signature register 730. Because of this configuration, the control circuitry can also be used to determine which outputs of the read-only memory 710 send out faulty test response signals. In this case, a decoder 760 can provide different gating signals to the AND gates within each of the sets of AND gates 740 and 750. Inverters 770 are employed such that the first multiple-input signature register 720 and the second multiple-input signature register 730 receive different test response bits.

Figure 8:
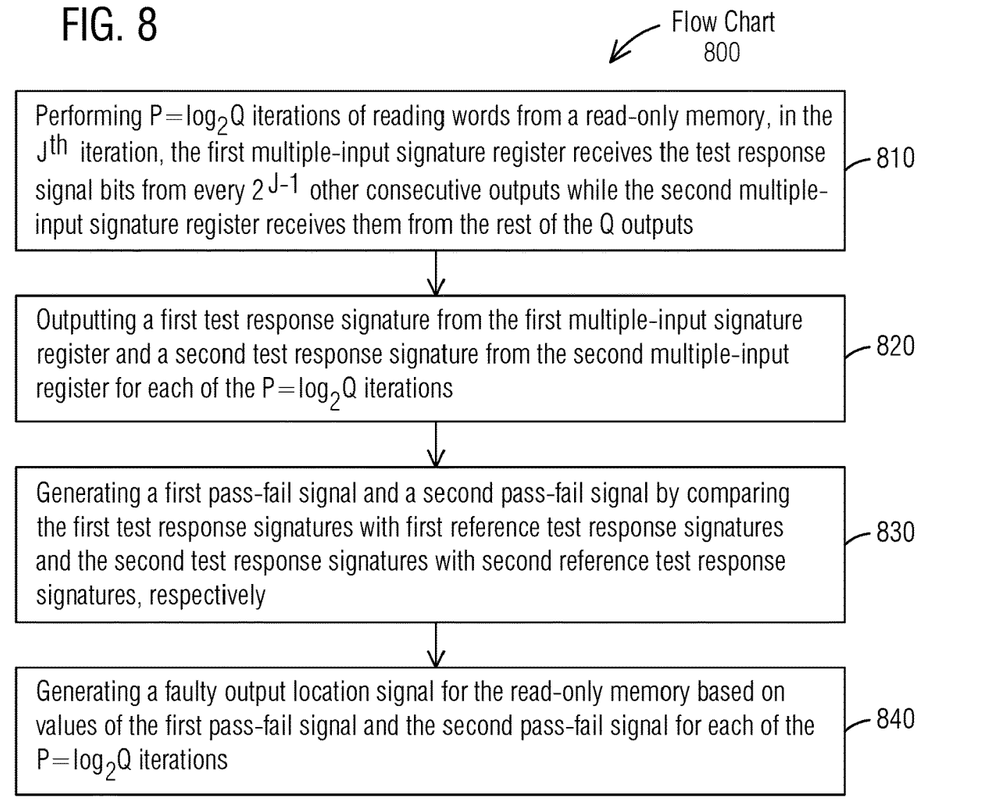
FIG. 8 illustrates a flowchart showing a process for diagnosing faulty outputs of a read-only memory that may be implemented according to various examples of the disclosed technology.

FIG. 8 illustrates a flowchart 800 showing a process for diagnosing faulty outputs of a read-only memory 810 that may be implemented according to various examples of the disclosed technology. For ease of understanding, methods for diagnosing faulty outputs of a read-only memory that may be employed according to various embodiments of the disclosed technology will be described with reference to the testing circuit illustrated in FIG. 7 and the flow chart 800 illustrated in FIG. 8. It should be appreciated, however, that a different testing circuit may be used to perform the method for diagnosing faulty outputs of a read-only memory illustrated by the flow chart 800 according to various embodiments of the disclosed technology. Likewise, the testing circuit show in FIG. 7 may be employed to perform other methods for diagnosing faulty outputs of a read-only memory according to various embodiments of the disclosed technology.

In operation 810 of the flow chart 800, $P=\log_2 Q$ iterations of reading words from the read-only memory 710 is performed. Here, Q is the number of outputs of the read-only memory 710. In the $J^{th}$ iteration of the $P=\log_2 Q$ iterations (J=1 to P), the first multiple-input signature register 720 receives the test response signal bits from every $2^{J-1}$ other consecutive outputs while the second multiple-input signature register 730 receives the test response signal bits from rest of the outputs of the read-only memory 710. This is controlled by the gating signal generated by the decoder 760 in the control circuitry 700.

In operation 820, for each of the $P=\log_2 Q$ iterations, the first multiple-input signature register 720 and the second multiple-input signature register 730 output a first test response signature and a second test response signature, respectively. In operation 830, a first pass-fail signal is generated by comparing the first test response signatures with first reference test response signatures and a second pass-fail signal is generated by comparing the second test response signatures with second reference test response signatures. In operation 840, a faulty output location signal for the read-only memory 810 is generated based on values of the first pass-fail signal and the second pass-fail signal for each of the $P=\log_2 Q$ iterations.

The example illustrated in FIG. 4 can be slightly modified to show how to use the method illustrated by the flow chart 800 to locate a faulty output. Assume the read-only memory 710 has eight outputs. As such, $\log_2 8=3$ iterations of reading the words stored in the read-only memory 710 need to be performed. In the first iteration (iteration 0 shown in the figure), the first multiple-input signature register 720 receives test response signal bits from every $2^{1-1}=1$ consecutive outputs (outputs 0, 2, 4, 6) of the read-only memory 710 while the second multiple-input signature register 720 receives test response signal bits from the rest of the outputs (outputs 1, 3, 5, 7). In the second iteration (iteration 1 shown in the figure), the first multiple-input signature register 720 receives test response signal bits from every $2^{2-1}=2$ consecutive outputs (outputs 0, 1, 4, 5) of the read-only memory 710 while the second multiple-input signature register 720 receives test response signal bits from the rest of the outputs (outputs 2, 3, 6, 7). In the third iteration (iteration 2 shown in the figure), the first multiple-input signature register 720 receives test response signal bits from every $2^{3-1}=4$ consecutive outputs (outputs 0, 1, 2, 3) of the read-only memory 710 while the second multiple-input signature register 720 receives test response signal bits from the rest of the outputs (outputs 4, 5, 6, 7). Assuming output 6 is faulty, the first pass-fail signal has values of 1, 0, and 0 for the three iterations, respectively, while the second pass-fail signal has values of 0, 1, and 1 for the three iterations, respectively. As such, the address of the faulty output can be derived using, for example, the values of the second pass-fail signal: $0 \times 2^0 + 1 \times 2^1 + 1 \times 2^2 = 6$.

The methods illustrated in FIGS. 3 and 8 can be combined to diagnose faulty bits in a read-only memory according to various examples of the disclosed technology. The process can comprise two stages: one for diagnosing faulty words and the other for diagnosing faulty outputs. The total number of iterations will be $\log_2 Q + \log_2 N = \log_2 (Q^*N)$, where Q is the number of outputs of the read-only memory and N is the number of words stored in the read-only memory or in a specific section of the read-only memory. For a 1 Mb read-only memory, the total number of iterations needed for a test is $\log_2 2^{20} = 20$, and the total number of signatures derived during the test is $2 \times 20 = 40$.

Figure 9:
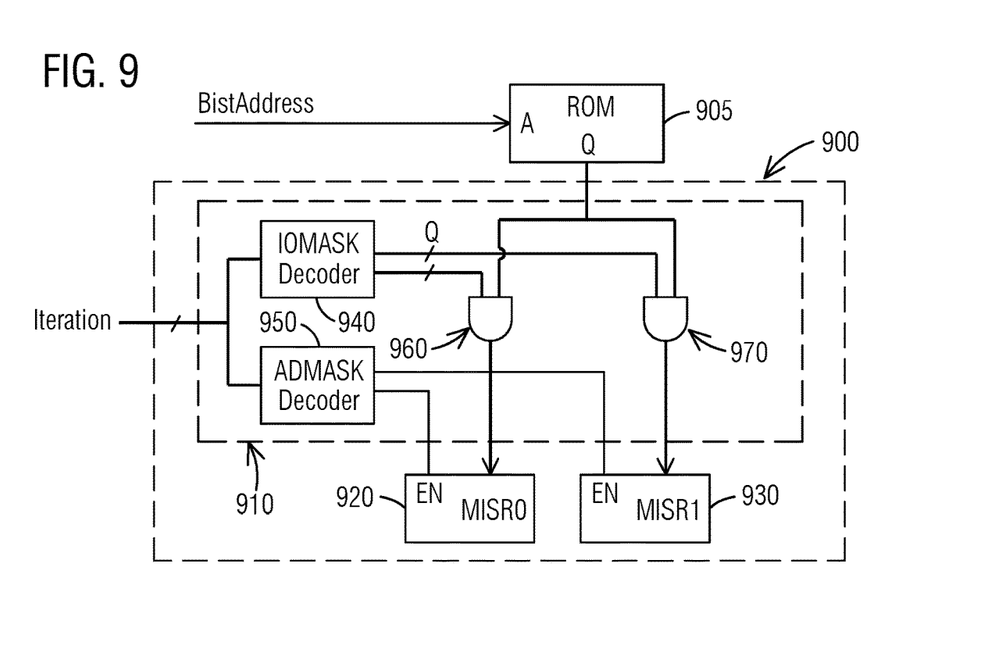
FIG. 9 illustrates an example of a block diagram of a testing circuit that can diagnose faulty bits in a read-only memory autonomously according to various embodiments of the disclosed technology.

FIG. 9 illustrates an example of a block diagram of a testing circuit 900 that can diagnose faulty bits in a read-only memory 905 autonomously according to various embodiments of the disclosed technology. The testing circuit 900 comprises control circuitry 910, a first multiple-input signature register 920, and a second multiple-input signature register 930. The control circuitry 910 comprises a first decoder 940, a second decoder 950, a first set of AND gates 960, and a second set of AND gates 970. The first decoder 940 is configured to generate a first set of gating signals for the first set of AND gates 960 and a second set of gating signals for the second set of AND gates 970, enabling them to control from which outputs of the read-only memory 905 each of the first multiple-input signature register 920 and the second multiple-input signature register 930 receives test response bits from the read-only memory 905. The second decoder 950 (may also be referred to as enable circuitry) is configured to generate an enable signal for each of the first multiple-input signature register 920 and the second multiple-input signature register 930, controlling them whether to receive test response bits from the read-only memory 905 or not.

The decoder 760 shown in FIG. 7 can generate a single set of gating signals for the first multiple-input signature register 720 and use inverters to derive another set of gating signals for the second multiple-input signature register 730 since the two multiple-input signature registers always receive test response bits from different outputs of the read-only memory 710. The control circuitry 910 cannot use a similar configuration because both of the first set of AND gates 960 and the second set of AND gates 970 need to allow the test response bits to reach the inputs of both the first multiple-input signature register 920 and the second multiple-input signature register 930 during the stage when the faulty words are diagnosed. Similarly, the second decoder 950 needs to generate two separate enable signals because both of the first multiple-input signature register 920 and the second multiple-input signature register 930 should be enabled during the stage when the faulty outputs are diagnosed. This is unlike how the control circuitry 520 works: one enable signal is generated for the second multiple-input signature register 540 and the enable signal for the first multiple-input signature register 930 is derived from the original one using the inverter 525.

Figure 10:
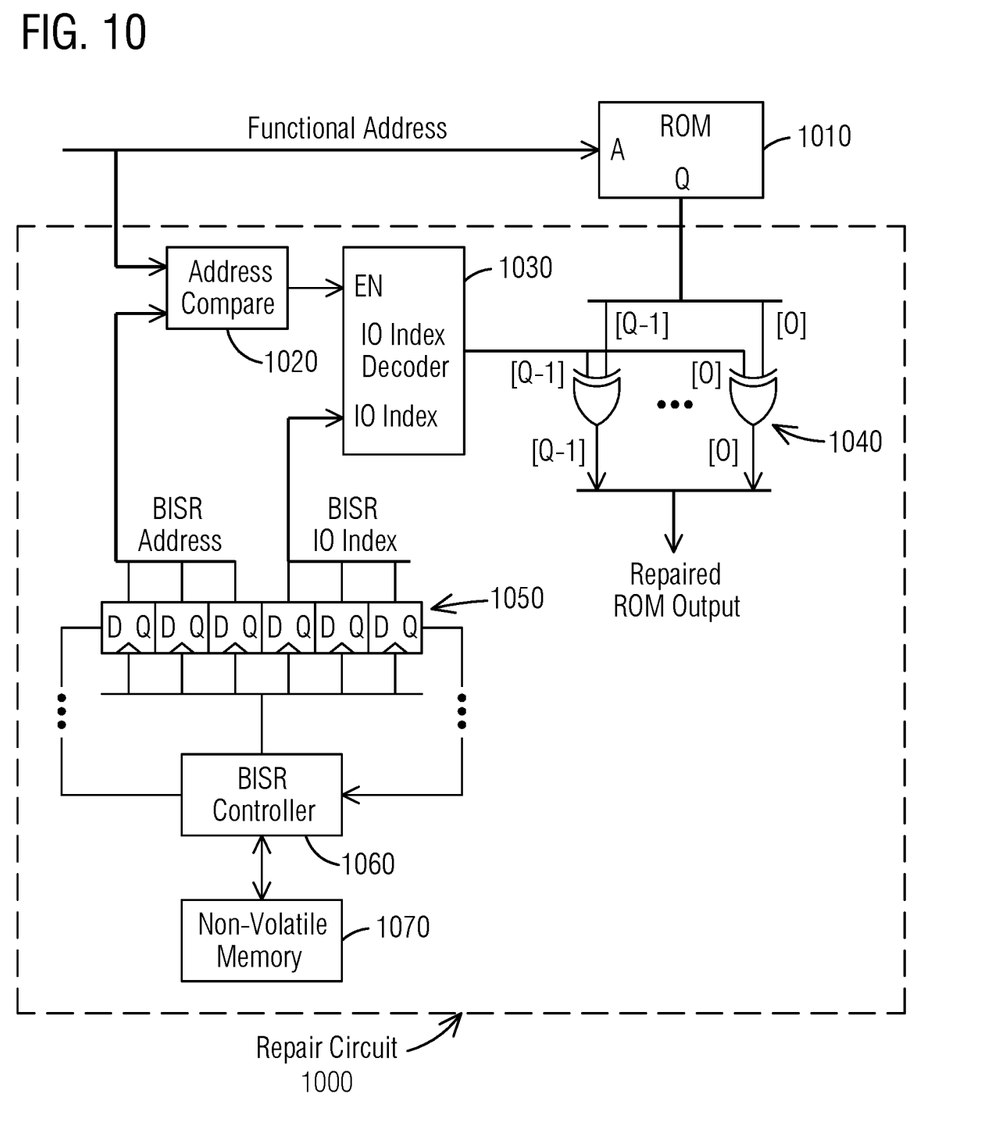
FIG. 10 illustrates an example of a block diagram of a repair circuit that can repair faulty bits in a read-only memory according to various embodiments of the disclosed technology.

FIG. 10 illustrates an example of a block diagram of a repair circuit 1000 that can repair faulty bits in a read-only memory 1010 according to various embodiments of the disclosed technology. The repair circuit 1000 comprises an address comparing device 1020, a decoder 1030, a set of XOR gates 1040, a built-in self-repair register 1050, a built-in self-repair controller 1060, and a non-volatile memory 1070. The non-volatile memory 1070 can store the address for the faulty word and the IO index for the faulty bit. The built-in self-repair controller 1060 can transfer them to the built-in self-repair register 1050. The address comparing device 1020 can compare the address for the faulty word with the functional address. If there is a match, the address comparing device 1020 will send a signal to enable the decoder 1030. The decoder will generate signals for the set of XOR gates 1040 corresponding to the IO index, allowing good bits of the word outputted from the non-volatile memory 1070 to pass through while inverting the faulty bit of the word. It is possible to repair faulty bits in multiple words.

Figure 11:
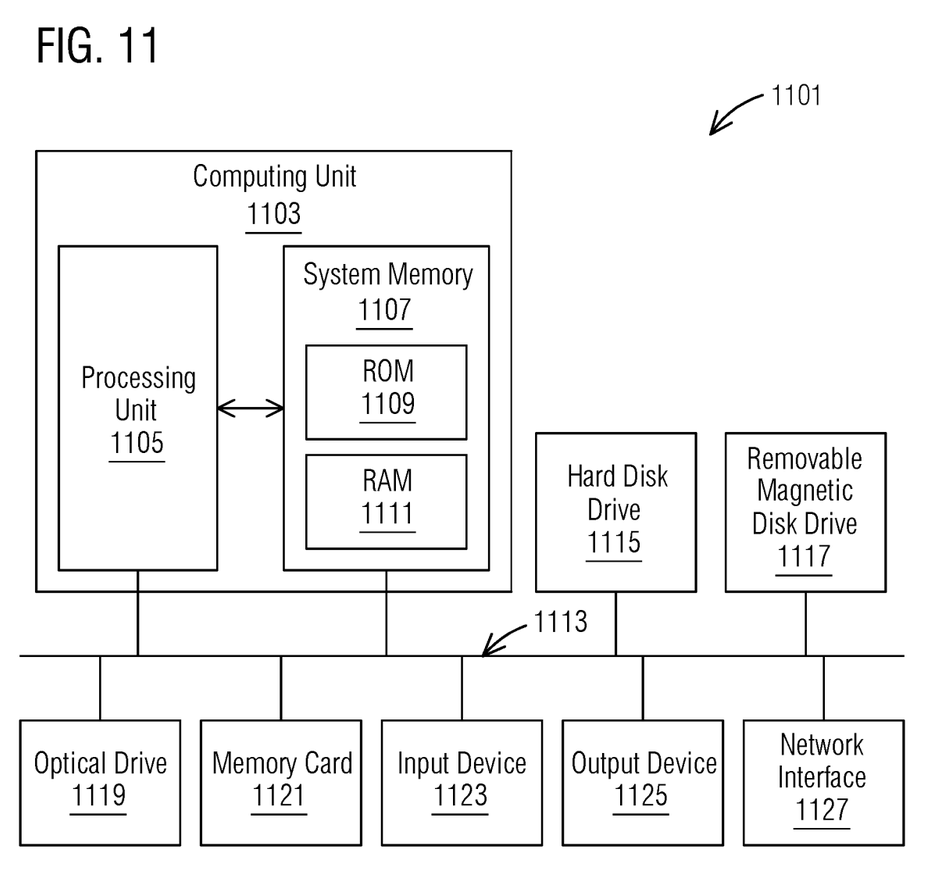
FIG. 11 illustrates a programmable computer system with which various embodiments of the disclosed technology may be employed.

Various examples of the disclosed technology may be implemented through the execution of software instructions by a computing device, such as a programmable computer. Accordingly, FIG. 11 shows an illustrative example of a computing device 1101. As seen in this figure, the computing device 1101 includes a computing unit 1103 with a processing unit 1105 and a system memory 1107. The processing unit 1105 may be any type of programmable electronic device for executing software instructions, but it will conventionally be a microprocessor. The system memory 1107 may include both a read-only memory (ROM) 1109 and a random access memory (RAM) 1111. As will be appreciated by those of ordinary skill in the art, both the read-only memory (ROM) 1109 and the random access memory (RANI) 1111 may store software instructions for execution by the processing unit 1105.

The processing unit 1105 and the system memory 1107 are connected, either directly or indirectly, through a bus 1113 or alternate communication structure, to one or more peripheral devices. For example, the processing unit 1105 or the system memory 1107 may be directly or indirectly connected to one or more additional memory storage devices, such as a "hard" magnetic disk drive 1115, a removable magnetic disk drive 1117, an optical disk drive 1119, or a flash memory card 1121. The processing unit 1105 and the system memory 1107 also may be directly or indirectly connected to one or more input devices 1123 and one or more output devices 1125. The input devices 1123 may include, for example, a keyboard, a pointing device (such as a mouse, touchpad, stylus, trackball, or joystick), a scanner, a camera, and a microphone. The output devices 1125 may include, for example, a monitor display, a printer and speakers. With various examples of the computer 1101, one or more of the peripheral devices 1115-1125 may be internally housed with the computing unit 1103. Alternately, one or more of the peripheral devices 1115-1125 may be external to the housing for the computing unit 1103 and connected to the bus 1113 through, for example, a Universal Serial Bus (USB) connection.

With some implementations, the computing unit 1103 may be directly or indirectly connected to one or more network interfaces 1127 for communicating with other devices making up a network. The network interface 1127 translates data and control signals from the computing unit 1103 into network messages according to one or more communication protocols, such as the transmission control protocol (TCP) and the Internet protocol (IP). Also, the interface 1127 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 1101 is illustrated as an example only, and it is not intended to be limiting. Various embodiments of the disclosed technology may be implemented using one or more computing devices that include the components of the computer 1101 illustrated in FIG. 11, which include only a subset of the components illustrated in FIG. 11, or which include an alternate combination of components, including components that are not shown in FIG. 11. For example, various embodiments of the disclosed technology may be implemented using a multiprocessor computer, a plurality of single and/or multiprocessor computers arranged into a network, or some combination of both.

CONCLUSION

Having illustrated and described the principles of the disclosed technology, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only preferred examples of the technologies and should not be taken as limiting the scope of the disclosed technology. Rather, the scope of the disclosed technology is defined by the following claims and their equivalents. We therefore claim as our disclosed technology all that comes within the scope and spirit of these claims.

What is claimed is:

1. A testing circuit in a circuit configured to test a read-only memory in the circuit, the testing comprising iterations of reading some or all of words stored in the read-only memory, the testing circuit comprising:
   a first multiple-input signature register configured to generate a first test response signature for each of the iterations based on test response signal bits received from outputs of the read-only memory during the each of the iterations;
   a second multiple-input signature register configured to generate a second test response signature for each of the iterations based on test response signal bits received from outputs of the read-only memory during the each of the iterations;
   control circuitry configured to control, according to a test algorithm, from which of the outputs of the read-only memory each of the first multiple-input signature register and the second multiple-input signature register receives the test response signal bits for each of the reading operations during each of the iterations;
   a first comparator configured to generate a first pass-fail signal based on comparing the first test response signature with first reference test response signatures;
   a second comparator configured to generate a second pass-fail signal based on comparing the second test response signature with second reference test response signatures; and
   a faulty element location determination device configured to generate a faulty element location signal for the read-only memory based on values of the first pass-fail signal and the second pass-fail signal for each of the iterations.

2. The testing circuit recited in claim 1, further comprising:
   a fail status device configured to generate a fail status signal indicating status of the read-only memory based on the first fail signal and the second fail signal, the status comprising fault-free, repair-needed, and non-repairable.

3. The testing circuit recited in claim 1, wherein the control circuitry comprises enable circuitry configured to generate an enable signal to enable either the first multiple-input signature register or the second multiple-input signature register, gating circuitry configured to allow the test response signal bits to be received by either the first multiple-input signature register or the second multiple-input signature register, or both of the enable circuitry and the gating circuitry.

4. The testing circuit recited in claim 1, wherein the test algorithm comprises:
   performing $M=\log_2 N$ iterations of reading N elements from the read-only memory, wherein in a $K^{th}$ iteration of the $M=\log_2 N$ iterations (K=1 to M), the first multiple-input signature register and the second multiple-input signature register alternatively receive the test response signal bits for every $2^{K-1}$ consecutive elements in the N elements, an element being a word, a row of words, a row block of words, a column of words, or a column block of words.

5. The testing circuit recited in claim 1, wherein the test algorithm comprises:
   performing $P=\log_2 Q$ iterations of reading W words from the read-only memory, Q being a number of the outputs of the read-only memory, wherein in a $J^{th}$ iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory.

6. The testing circuit recited in claim 5, wherein the test algorithm further comprises:
   performing $U=\log_2 W$ iterations of reading the W words, wherein in a $K^{th}$ iteration of the $U=\log_2 W$ iterations (K=1 to U), the first multiple-input signature register and the second multiple-input signature register alternatively receive the test response signal bits for every $2^{K-1}$ consecutive words.

7. The testing circuit recited in claim 6, further comprising:
   bit repair circuitry, the bit repair circuitry comprising:
      XOR gates, a number of the XOR gates being equal to Q, a decoder configured to generate Q bits representing pass or fail based on a faulty output location signal derived based on the $P=\log_2 Q$ iterations, two inputs for each of the XOR gates being coupled to one of the outputs of the read-only memory and one of outputs of the decoder, respectively, and a comparator configured to generate an enable signal to enable or disenable the decoder based on comparing a functional address signal received by the read-only memory with a faulty word location signal derived based on the $U=\log_2 W$ iterations, wherein the faulty element location signal comprises the faulty word location signal and the faulty output location signal.

8. The testing circuit recited in claim 1, further comprising:

repair circuitry configured to replace bits outputted from the read-only memory in response to a reading operation with bits stored in the circuit as output bits of the read-only memory when an address for the reading operation matches an address for an faulty element or one of addresses for faulty elements represented by the faulty element location signal, the faulty element being a faulty word, and the faulty elements being a faulty row of words or a faulty row block of words.

9. A method for testing a read-only memory in a circuit, the circuit comprising a first multiple-input signature register and a second multiple-input signature register, the method comprising:

performing $M=\log_2 N$ iterations of reading N elements from the read-only memory, wherein in a $K^{th}$ iteration of the $M=\log_2 N$ iterations (K=1 to M), the first multiple-input signature register and the second multiple-input signature register alternatively receive test response signal bits from the read-only memory for every $2^{K-1}$ consecutive elements in the N elements, an element being a word, a row of words, a row block of words, a column of words, or a column block of words;

outputting a first test response signature from the first multiple-input signature register and a second test response signature from the second multiple-input signature register for each of the $M=\log_2 N$ iterations;

generating a first pass-fail signal by comparing the first test response signature with first reference test response signatures and a second pass-fail signal by comparing the second test response signature with second reference test response signatures; and generating a faulty element location signal for the read-only memory based on values of the first pass-fail signal and the second pass-fail signal for each of the $M=\log_2 N$ iterations.

10. The method recited in claim 9, further comprising:

performing $P=\log_2 Q$ iterations of reading words from the read-only memory, Q being a number of outputs of the read-only memory, wherein in a $J^{th}$ iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory;

outputting a third test response signature from the first multiple-input signature register and a fourth test response signature from the second multiple-input signature register for each of the $P=\log_2 Q$ iterations;

generating a third pass-fail signal by comparing the third test response signatures with third reference test response signatures and a fourth pass-fail signal by comparing the fourth test response signatures with fourth reference test response signatures; and generating a faulty output location signal for the read-only memory based on values of the third pass-fail signal and the fourth pass-fail signal for each of the $P=\log_2 Q$ iterations.

11. A method for testing a read-only memory in a circuit, the circuit comprising a first multiple-input signature register and a second multiple-input signature register, the method comprising:

performing $P=\log_2 Q$ iterations of reading words from the read-only memory, Q being a number of outputs of the read-only memory, wherein in a $J^{th}$ iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory;

outputting a first test response signature from the first multiple-input signature register and a second test response signature from the second multiple-input signature register for each of the $P=\log_2 Q$ iterations;

generating a first pass-fail signal by comparing the first test response signature with first reference test response signatures and a second pass-fail signal by comparing the second test response signature with second reference test response signatures; and generating a faulty output location signal for the read-only memory based on values of the first pass-fail signal and the second pass-fail signal for each of the $P=\log_2 Q$ iterations.

12. One or more computer-readable media storing computer-executable instructions for causing a computer to perform a method, the method comprising:

creating, in a circuit design, a testing circuit, the test circuit comprising:

a first multiple-input signature register configured to generate a first test response signature for each of the iterations based on test response signal bits received from outputs of the read-only memory during the each of the iterations;

a second multiple-input signature register configured to generate a second test response signature for each of the iterations based on test response signal bits received from outputs of the read-only memory during the each of the iterations;

control circuitry configured to control, according to a test algorithm, from which of the outputs of the read-only memory each of the first multiple-input signature register and the second multiple-input signature register receives the test response signal bits for each of the reading operations during each of the iterations;

a first comparator configured to generate a first pass-fail signal based on comparing the first test response signature with first reference test response signatures;

a second comparator configured to generate a second pass-fail signal based on comparing the second test response signature with second reference test response signatures; and a faulty element location determination device configured to generate a faulty element location signal for the read-only memory based on values of the first pass-fail signal and the second pass-fail signal for each of the iterations.

13. The one or more computer-readable media recited in claim 12, wherein the test circuit further comprises:
a fail status device configured to generate a fail status signal indicating status of the read-only memory based on the first fail signal and the second fail signal, the status comprising fault-free, repair-needed, and non-repairable.

14. The one or more computer-readable media recited in claim 12, wherein the control circuitry comprises enable circuitry configured to generate an enable signal to enable either the first multiple-input signature register or the second multiple-input signature register, gating circuitry configured to allow the test response signal bits to be received by either the first multiple-input signature register or the second multiple-input signature register, or both of the enable circuitry and the gating circuitry.

15. The one or more computer-readable media recited in claim 12, wherein the test algorithm comprises:
performing $M=\log_2 N$ iterations of reading N elements from the read-only memory, wherein in a $K^{th}$ iteration of the $M=\log_2 N$ iterations (K=1 to M), the first multiple-input signature register and the second multiple-input signature register alternatively receive the test response signal bits for every $2^{K-1}$ consecutive elements in the N elements, an element being a word, a row of words, a row block of words, a column of words, or a column block of words.

16. The one or more computer-readable media recited in claim 12, wherein the test algorithm comprises:
performing $P=\log_2 Q$ iterations of reading W words from the read-only memory, Q being a number of the outputs of the read-only memory, wherein in a $J^{th}$ iteration of the $P=\log_2 Q$ iterations (J=1 to P), the first multiple-input signature register receives the test response signal bits from every $2^{J-1}$ other consecutive outputs while the second multiple-input signature register receives the test response signal bits from rest of the outputs of the read-only memory.

17. The one or more computer-readable media recited in claim 16, wherein the test algorithm further comprises:
performing $U=\log_2 W$ iterations of reading the W words, wherein in a $K^{th}$ iteration of the $U=\log_2 W$ iterations (K=1 to U), the first multiple-input signature register and the second multiple-input signature register alternatively receive the test response signal bits for every $2^{K-1}$ consecutive words.

18. The one or more computer-readable media recited in claim 17, wherein the test circuit further comprises:
bit repair circuitry, the bit repair circuitry comprising:
XOR gates, a number of the XOR gates being equal to Q, a decoder configured to generate Q bits representing pass or fail based on a faulty output location signal derived based on the $P=\log_2 Q$ iterations, two inputs for each of the XOR gates being coupled to one of the outputs of the read-only memory and one of outputs of the decoder, respectively, and
a comparator configured to generate an enable signal to enable or disenable the decoder based on comparing a functional address signal received by the read-only memory with a faulty word location signal derived based on the $U=\log_2 W$ iterations,
wherein the faulty element location signal comprises the faulty word location signal and the faulty output location signal.

19. The one or more computer-readable media recited in claim 12, wherein the test circuit further comprises:
repair circuitry configured to replace bits outputted from the read-only memory in response to a reading operation with bits stored in the circuit as output bits of the read-only memory when an address for the reading operation matches an address for an faulty element or one of addresses for faulty elements represented by the faulty element location signal, the faulty element being a faulty word, and the faulty elements being a faulty row of words or a faulty row block of words.

* * * * *